METHOD OF MAKING SEALING MEMBERS

Original Filed Jan. 3, 1961 4 Sheets-Sheet 1

INVENTOR.
PHILLIP V. MILLARD
BY
Barnes, Kisselle, Raisch & Choate
ATTORNEYS

METHOD OF MAKING SEALING MEMBERS

Original Filed Jan. 3, 1961 4 Sheets-Sheet 2

INVENTOR.
PHILLIP V. MILLARD
BY
Barnes, Kisselle, Raisch & Choate
ATTORNEYS

METHOD OF MAKING SEALING MEMBERS

Original Filed Jan. 3, 1961 4 Sheets-Sheet 3

INVENTOR.
PHILLIP V. MILLARD
BY
Barnes, Kisselle, Raisch & Choate
ATTORNEYS

METHOD OF MAKING SEALING MEMBERS

Original Filed Jan. 3, 1961 4 Sheets-Sheet 4

INVENTOR.
PHILLIP V. MILLARD
BY
Barnes, Kisselle, Raisch & Choate
ATTORNEYS

United States Patent Office

Re. 26,740
Reissued Dec. 23, 1969

26,740

METHOD OF MAKING SEALING MEMBERS

Phillip V. Millard, Lighthouse Point, Fla., assignor to Automotive Rubber Company, Inc., Detroit, Mich., a corporation of Michigan Original No. 3,272,904, dated Sept. 13, 1966, Ser. No. 409,141, Nov. 5, 1964, which is a division of applications Ser. No. 80,444, Jan. 3, 1961, and Ser. No. 163,411, Jan. 2, 1962. Application for reissue Oct. 29, 1968, Ser. No. 777,542

Int. Cl. B29h *9/10*

U.S. Cl. 264—274 6 Claims

Matter enclosed in heavy brackets [ ] appears in the original patent but forms no part of this reissue specification; matter printed in italics indicates the additions made by reissue.

*ABSTRACT OF THE DISCLOSURE*

*A method of making a sealing member in which a sheet metal body is formed with a peripheral flange and is supported on an open mold with the flange suspended in a cavity of the mold. Uncured vinyl plastic material is poured into the mold cavity and is then cured to provide a resilient seating edge accurately located with respect to the metal body.*

This application is a division of my co-pending applications, Serial No. 80,444, filed January 3, 1961, now Patent No. 3,182,119 and Serial No. 163,411, filed January 2, 1962 and now abandoned.

This invention relates to sealing members such as insulating grommets which are used to insulate wires, cables and pipes from a panel through which they are threaded, gaskets such as annular resilient sealing gaskets having accurately formed surfaces and sealing members comprising rigid bodies having resilient sealing gaskets along a peripheral edge thereof.

In various automotive and aeronautical applications, it is necessary to thread wires, cables or pipes through an opening in a wall or panel. It is desirable and often necessary that these items be insulated electrically from the panel. In addition, because of the great emphasis being placed on sound proofing and moisture proofing, it is desirable that the arrangement be such that sound and moisture will not be transmitted by movement of the wires, cables or pipes relative to the panel. Heretofore, grommets have been made by dipping or pressure molding the resilient materials comprising the grommets about a clip or the like.

It is therefore an object of this invention to provide a novel method for forming grommets of the above-mentioned type.

The novel method for forming the grommets comprises positioning the ring in an open mold with the prongs extending upwardly, the outer edge of the ring engaging projections or a shoulder in the side wall of the mold thereby holding the ring in spaced relation to the bottom of the mold. A predetermined quantity of an uncured elastomeric composition in liquid form is poured into the mold and the elastomer is cured. When the resultant grommet is removed from the mold, it has been accurately formed and the ring is embedded in the interior thereof with the prongs extending outwardly. A preferred type of elastomeric composition comprises what are commonly known as plastisols. Closed cell foamed plastisols are especially suitable for grommets embodying the invention.

At the present time, conventional resilient gaskets are made either by cutting the gasket from a sheet of resilient material or by pressure molding the gasket in a closed mold. However, making the gaskets by cutting is an expensive operation due to the great waste. Also, making the gaskets by pressure molding is also expensive due to the cost of the molding equipment.

It is therefore an object of this invention to provide a method for forming an annular gasket which is generally rectangular in cross section and has accurately formed bottom and side surfaces and may have accurately formed holes and projections.

It is a further object of the invention to provide a method for making a sealing member formed of a metal body and an edge portion formed of resilient material which also has accurately formed bottom and side surfaces.

The invention contemplates the formation of gaskets by pouring a predetermined quantity of uncured vinyl plastic material in an open face mold having a cavity in one surface thereof which has accurately formed surfaces. Accurately formed and located pins may be provided in the cavity to form accurately formed and located openings in the gasket. Similarly, the cavity may be provided with accurately formed projections to define desired projections on the gasket. Where the gasket is to be formed on the sheet metal body of a sealing member, the mold is provided with locating means that accurately locate the sheet metal member in such a fashion that the sealing edge is suspended in the cavity so that the uncured vinyl plastic material surrounds the edge of the sealing member and forms a gasket on the edge when the uncured vinyl plastic material is cured.

Referring to the drawings.

Figure 1:
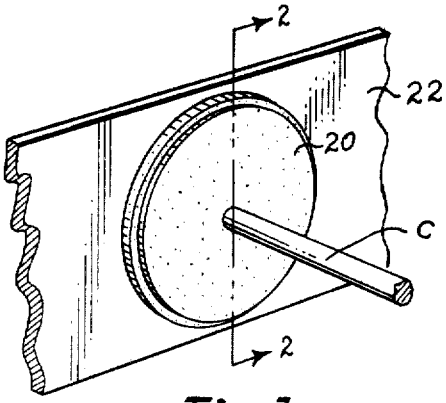
FIG. 1 is a fragmentary perspective view of a grommet embodying the invention shown in position in an opening in a vertical panel.
Figure 2:
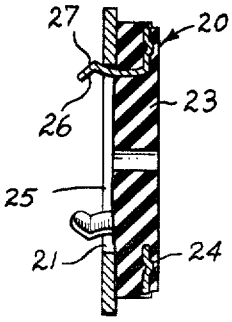
FIG. 2 is a fragmentary sectional view taken along the line 2—2 in FIG. 1.
Figure 3:
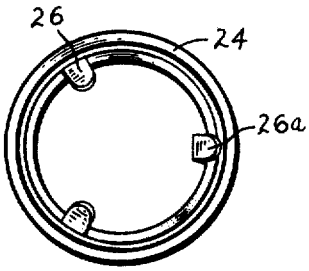
FIG. 3 is a bottom view of a ring which forms part of the grommet embodying the invention.
Figure 4:
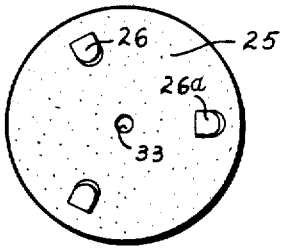
FIG. 4 is a bottom view of the grommet shown in FIGS. 1 and 2 embodying the invention.

Referring to FIG. 1, grommet 20 embodying the invention is adapted to be mounted in an opening 21 of a vertical panel 22. As further shown in FIG. 2, the grommet 20 comprises a generally cylindrical body 23 of soft resilient material such as foamed rubber, foamed plastic or soft dense plastic. Boy 23 is of general uniform axial thickness and a ring 24 is embedded in the body 23. Body 23 thus includes a flat annular surface 25 which is adapted to engage the edge of the opening 21. As shown in the drawings, ring 24 is positioned axially relative to the body 23 near the surface of the body 23 which is remote from surface 25 and includes circumferentially spaced integral fingers 26, 26a shaped in the form of spring members that are adapted to engage the sides of the opening 21 to hold the grommet in position, compressing the body 23 so that the surface 25 engages the edge of the opening 21. Finger 26a extends outwardly engaging the edge of opening 21. As shown in FIG. 2, each finger 26 includes an outwardly extending portion 27 and the grommet is applied by forcing the fingers axially through the opening, momentarily bending the fingers 26 inwardly so that after they pass through the opening they return to their original position drawing the ring 24 and, in turn, the body 23 axially toward the opening 21 and compressing the portion 25 of the body 23 which contacts the edge of the opening against the opening. The compression and the softness of the material is such that the material is partially deformed into the opening 21.

Figure 5:
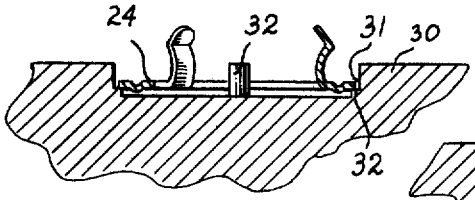
FIG. 5 is a fragmentary sectional view showing the apparatus for forming the grommet of FIGS. 1 to 4.
Figure 6:
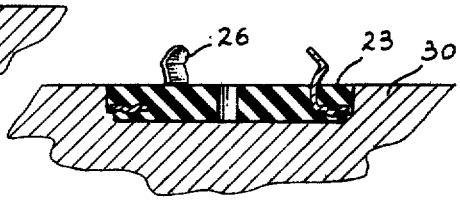
FIG. 6 is a view similar to FIG. 5 showing the grommet after it has been formed.

The grommet 20 is preferably made by foaming or casting the soft resilient material in place about the ring 24. An apparatus for making the grommet is shown in FIG. 5 and comprises a mold 30 which includes an opening 31 having a peripheral shoulder or ledge 32 against which the periphery of the ring 24 rests thereby holding the ring in spaced relationship to the bottom of the opening 31. An insert 32 in mold 31 provides the opening 33 through which the cable C extends. The ring 24 is placed in position with the fingers 26 extending upwardly and the foamed plastic is poured into the mold to fill the mold as shown in FIG. 6. The plastic is then cured in an oven or at room temperature, if it is of the room temperature curing type, and the grommet is removed from the mold.

Figure 7:
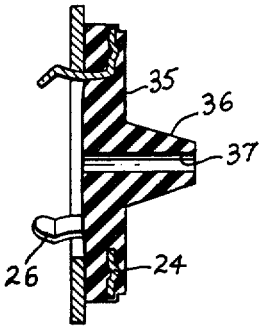
FIG. 7 is a sectional view similar to FIG. 2 of a modified form of grommet.

A modified form of grommet is shown in FIG. 7 wherein the body 35 has a nose or axially extending portion 36 surrounding the opening 37 through which the wire, cable or pipe extends. This form of the invention is particularly useful for use with pipe, rods and the like, which may extend at an angle to the opening through the panel. The nose 36 engages the pipe and provides a good seal between the pipe and the nose.

Figure 8:
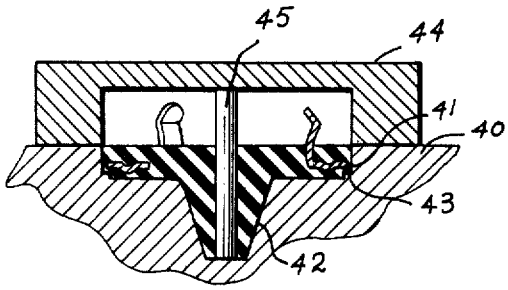
FIG. 8 is a sectional view similar to FIG. 6 showing the apparatus for making the grommet shown in FIG. 7.

The grommet shown in FIG. 7 may be formed in an apparatus such as shown in FIG. 8 which includes a mold 40 having an opening 41 therein including a frusto-conical portion 42. Opening 41 is formed with a peripheral ledge 43 on which the ring 24 is positioned. The mold includes an upper section 44 that has an axially extending pin 45 that is adapted to extend into the projection 42 to form the opening of the grommet. In making the grommet, the ring 24 is placed in the opening 41, the foaming plastic is poured into the opening and then the section 44 is brought into position forcing the pin 45 downwardly into the projection so that when the foam material is cured the grommet is formed with an opening. After curing, the section 44 is removed and then the grommet can be removed from the mold 40.

Figure 10:
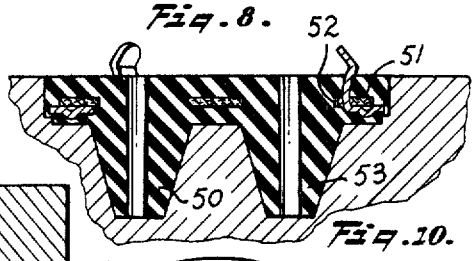
FIG. 10 is a fragmentary sectional view of an apparatus for making the grommet shown in FIG. 9.
Figure 9:
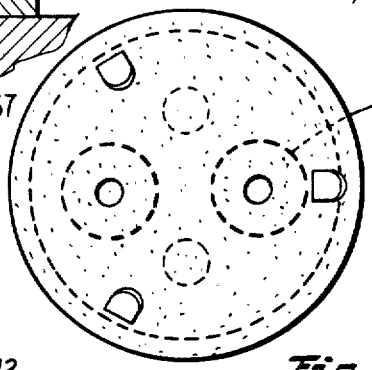
FIG. 9 is a plan view of a still further modified form of grommet.

A further modified form of the invention is shown in FIG. 9 and FIG. 10 wherein an addition to nose sections 50, the grommet includes a reinforcing plate 51 that is placed in position over the ring 23 before casting the grommet. The plate 51 may comprise fiber board, metal or the like and includes opening 52 aligned with the openings 53 of the nose portions 50. The disc or plate 51 operates to give rigidity to the central portion of the grommet.

Figure 12:
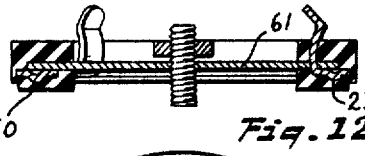
FIG. 12 is a sectional view taken along the line 12—12 in FIG. 11.
Figure 11:
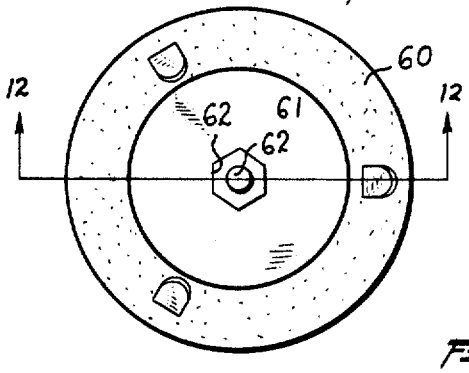
FIG. 11 is a plan view of a further modified form of grommet.

A further modified form of the invention is shown in FIGS. 11 and 12 wherein the grommet 60 is formed with an integral circumferential sheet 61 that is embedded in the grommet. The sheet is formed in such a manner that a bolt 62 can be threaded into the sheet extending through the opening of the body of the grommet thereby providing a mounting for some piece of apparatus on the grommet. For example, a nut 63 can be threaded on the bolt 62.

Figure 13:
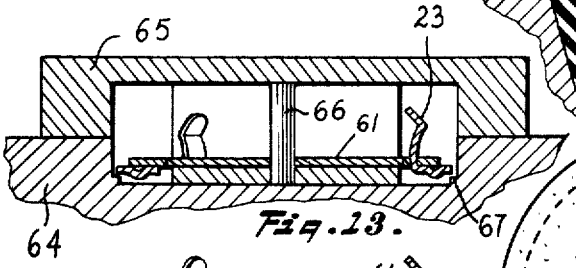
FIG. 13 is a fragmentary sectional view of the apparatus for forming the grommet of FIGS. 11 and 12.

The grommet shown in FIGS. 11 and 12 may be made in an apparatus such as shown in FIG. 13 which includes a mold 64 having an upper section 65 with a downwardly extending pin 66 that extends into the opening in sheet 61. The mold 64 is formed with a shoulder 67 that spaces the ring 23 in the same manner as in the previous forms of the invention.

Figure 14:
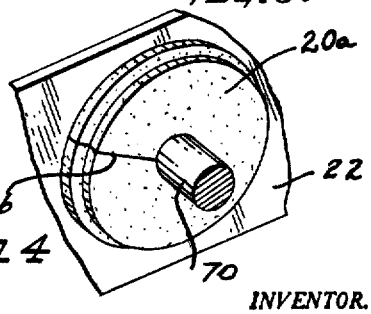
FIG. 14 is a perspective view of a further modified form of grommet.

The form of the invention shown in FIG. 14 comprises a grommet 20a that is identical to that shown in FIGS. 1, 2 and 6 except that the grommet is cut along a radial plane as at 20b so that the grommet can be placed over a wire or rod 70 that is already in position passing through the wall 22. The cut 20b can be made after the grommet is formed by cutting through the body 23 and the ring 24, or alternatively, the ring 24 can be cut through prior to forming of the grommet and a baffle (not shown) can be used in the molding process so that when the grommet is molded, the slit 20b is formed therein. The slit 20b can lie in a single plane or can be a sinous or corrugated configuration.

Figure 15:
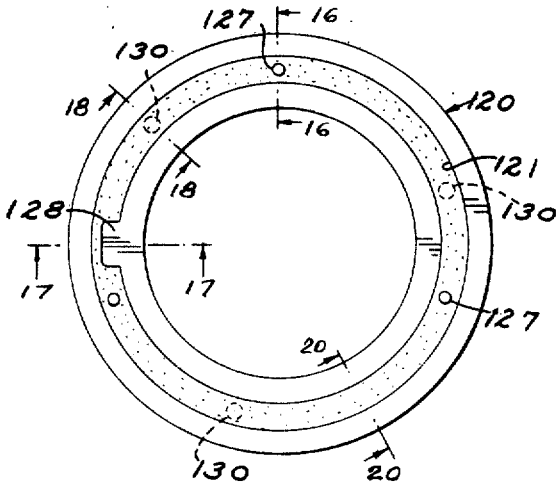
FIG. 15 is a plan view of a mold used in making the gasket embodying the invention.

Referring to FIG. 15, in the practice of the invention, an open face mold 120 is used having an annular cavity 121, the surfaces of which are accurately formed to define the sides and bottom of a gasket. A predetermined quantity of a vinyl plastic material is introduced into the cavity 121 and the material is cured in situ to form the gasket.

Figure 16:
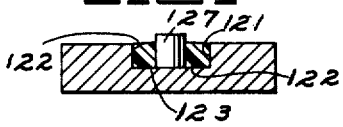
FIG. 16 is a sectional view on an enlarged scale taken on the line 16—16 in FIG. 15.
Figure 17:
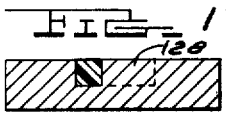
FIG. 17 is a sectional view on an enlarged scale taken on the line 17—17 of FIG. 15.
Figure 18:
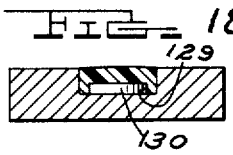
FIG. 18 is a sectional view taken on the line 18—18 in FIG. 15.

As shown in FIGS. 16, 17 and 18, the cavity 121 includes accurately formed side surfaces 122 and bottom surface 123 so that the resultant gasket has a cross section which includes accurately formed side surfaces 124 and bottom surface 125. The top surface 126 of the gasket constitutes the natural surface of the cured plastic and is not accurately defined by any surface.

By modifying the molding, various openings and projections may be provided on the finished gasket G. For example, as shown in FIGS. 15 and 16, a pin 127 can be accurately located in the cavity 121. The surface of the pin 127 is accurately formed so that the plastic material when cured about the pin defines an opening that is accurately located and formed. As shown in FIGS. 15 and 17, a cutaway can be provided in the gasket by making the cavity narrower as by a projection 128 on the mold. As shown in FIGS. 15 and 18, a shallow depression or opening 129 can be provided in the bottom surface of the gasket by locating a short pin or projection 130 accurately in the cavity, the surfaces of the pin 130 being accurately formed.

Figure 21:
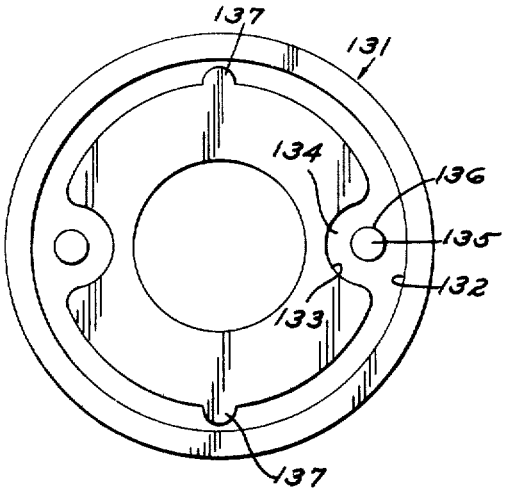
FIG. 21 is a plan view of a modified form of mold.
Figure 20:
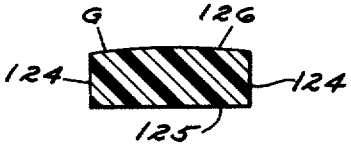
FIG. 20 is a sectional view taken on the line 20—20 in FIG. 15.

In the mold 131 shown in FIG. 21, the cavity 132 has cutaway portions 133 that provide projections 134 in the finished gasket. In addition, pins 135 define openings 136 in the projections 134 of the gasket. Further, the mold is provided with projections 137 that make the gasket narrower at certain portions.

In accordance with the method and apparatus, a gasket is formed that has accurately formed bottom and side surfaces. The bottom surface can be formed with ribs and other configurations accurately without cutting or trimming merely by accurately forming these configurations in the bottom surface of the cavity of the mold.

Figure 19:
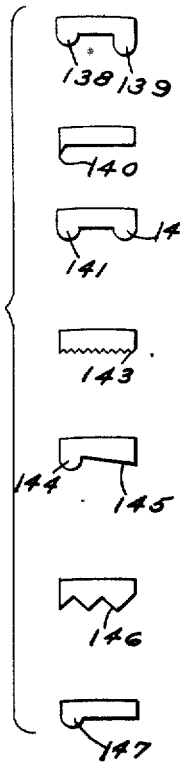
FIG. 19 is a view showing various cross sections of gaskets that can be made in accordance with the invention.

Thus, as shown in FIG. 19, the gasket can be made so that the cross section has spaced peripheral beads 138, 139 of different depths or a sharp sealing edge 140, spaced peripheral beads 141, 142 of equal depth, a plurality of annular ribs 143, a peripheral rib 144 and an inclined surface 145, large peripheral beads 146, and a single peripheral bead 147.

Figure 22:
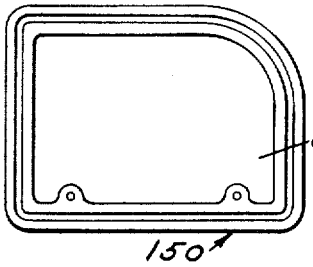
FIG. 22 is a plan view of a sealing member embodying the invention.
Figure 23:
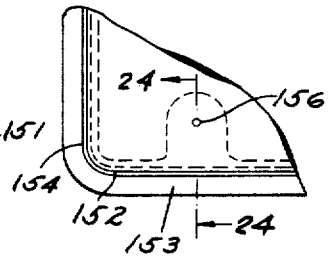
FIG. 23 is a plan view of a mold for making the sealing member shown in FIG. 22.
Figure 24:
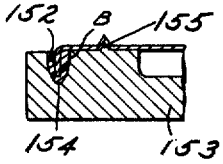
FIG. 24 is a fragmentary sectional view on an enlarged scale taken on the line 24—24 in FIG. 23.

In accordance with the invention, a sealing member 150 can also be made such as used in car heaters. As shown in FIGS. 22, 23 and 24, a sealing member 150 comprises a flat sheet metal body 151 having a downwardly turned peripheral flange or edge 152 over which a gasket bead is provided.

In accordance with the invention, a mold 153 has a cavity 154 accurately formed in one surface thereof. The mold is provided with projections 155 which engage dimples 156 in the sheet metal member 151 to locate the sheet metal member relative to the mold 153 so that the edge 152 projects downwardly into the cavity 154 in spaced relation to the bottom and side surfaces of the cavity 154. Uncured vinyl plastic material is then poured into cavity 154 in a predetermined quantity and the material is cured in situ so that it becomes bonded to the edge 152 and defines a gasket thereon which has bottom and side surfaces that are accurately formed.

Figure 27:
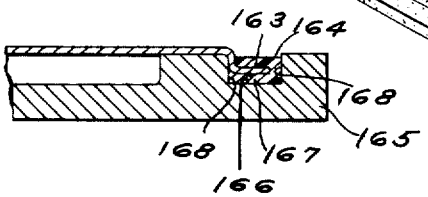
FIG. 27 is a fragmentary sectional view on an enlarged scale taken along the line 27—27 in FIG. 26.
Figure 25:
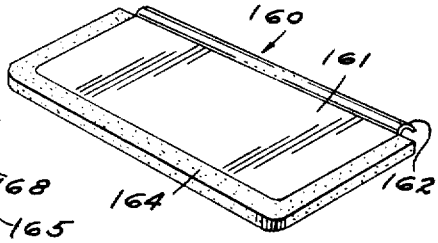
FIG. 25 is a perspective view of a modified form of sealing member.
Figure 26:
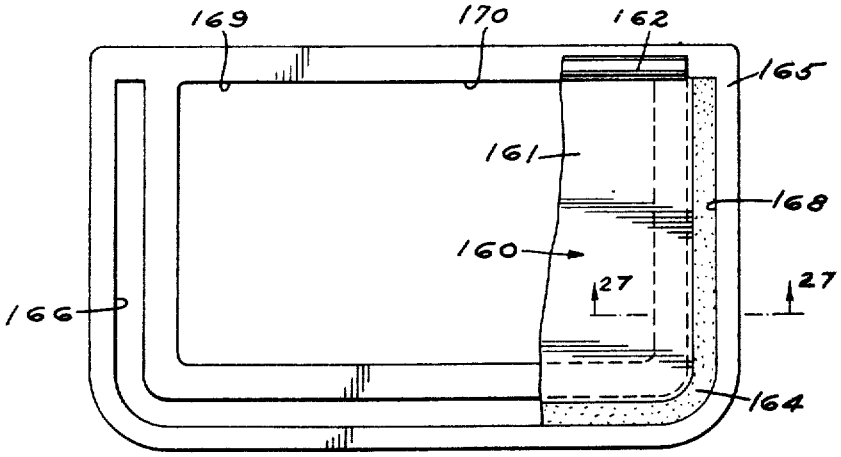
FIG. 26 is a plan view of an apparatus for making the sealing member shown in FIG. 25.

Referring to FIG. 25, a sealing member 160 can also be made in accordance with the invention. Sealing member 160 comprises a rectangular sheet metal body 161 having a curved flange 162 along one side and an offset flange 163 on the other three sides thereof. A gasket 164 surrounds the edge of flange 163. Sealing member 160 is made by positioning the body 161 on a mold 165 having a cavity 166 in one surface thereof into which the flange 163 extends. As shown in FIG. 27, the bottom 167 and side surfaces 168 of the cavity 166 are accurately formed so that when the body 161 rests on the surface of the cavity, the peripheral flange 163 extends into the cavity and is suspended therein. The mold 165 is formed with a cutaway portion 169 in the surface thereof and the curved flange 162 engages one edge 170 thereof to accurately center and locate the body 161 therein. When the predetermined quantity of an uncured vinyl plastic material is introduced in the cavity 166 and the material is cured in situ, it becomes bonded to the edge 163 and forms an integral gasket 164 on the sealing member 160.

The vinyl plastic compositions which are used in the invention may be of various types, such as vinyl chlorides and vinyl copolymers of either the dense or foam variety.

Example I

A vinyl plastic foam or sponge composition which produces satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticisers | 60.0 |
| Monomeric plasticizers | 250.0 |
| Color | 1.0 |

Example II

Another vinyl plastic sponge composition which produces satisfactory results has the following composition in parts by weight:

| | Parts |
|---|---|
| Resin | 100 |
| Stabilizer | 2 |
| Plasticizer | 50 |
| CaO | 1 |
| Plasticizer | 60 |
| Wetting agent | 4 |
| Softener | 10 |
| Blowing agent | 2.5 |

Example III

A soft dense vinyl composition which produces satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticisers | 15–30 |
| Monomeric plasticisers | 75–115 |
| Diluent plasticisers | 5–15 |
| Color | 1.0 |
| Blowing | 1.0 |

It can thus be seen that there has been provided a novel method for making a novel sealing member.

I claim:

1. The method of making a sealing member having a sheet metal body with a portion embedded in a resilient plastic body that has accurately formed sealing surfaces which are accurately positioned relative to the metal body, which comprises forming a registering surface on the underside of said metal body on which the plastic body is to be formed, supporting the metal body at said registering surface from an area of a mold which is spaced inwardly from the peripheral edge of the metal body such that the portion of the metal body on which the plastic body is to be formed extends into a cavity of the mold and is suspended in the cavity in accurately spaced relation to the bottom of the cavity and in accurately spaced relation laterally of the cavity, introducing a predetermined quantity of uncured vinyl plastic material into said cavity, and curing said vinyl plastic material to form a resilient plastic body on said portion of the metal body which is suspended within said cavity.

2. The method of making a sealing member having a sheet metal body with an annular portion embedded in a resilient plastic body that has accurately formed sealing surfaces which are accurately positioned relative to the metal body, which comprises forming an annular registering surface on the underside of said metal body which is elevated with respect to the portion of the metal body on which the plastic body is to be formed, supporting the metal body at said registering surface from an annular area of a mold which is spaced radially inwardly from the peripheral edge of the metal body such that the annular portion of the metal body on which the plastic body is to be formed extends into an annular cavity of the mold and is suspended in the cavity in accurately spaced relation to the bottom of the cavity and in accurately spaced relation laterally of the cavity, introducing a predetermined quantity of uncured vinyl plastic material into said cavity, and curing said vinyl plastic material to form a resilient plastic body on said portion of the metal body which is suspended within said cavity.

*3. A method of making a sealing member as defined in claim 1 further comprising: forming a depending flange on at least a portion of the periphery of the metal body to define said portion of the metal body on which the plastic body is to be formed such that the flange extends into the cavity of the mold and is suspended in accurately spaced relation to the bottom of the cavity and in accurately spaced relation laterally of the cavity wherein*

*when said predetermined quantity of uncured vinyl plastic material is introduced into said cavity and cured, said resilient plastic body is formed on said flange.*

*4. A method of making a sealing member as defined in claim 1 further comprising: forming said metal body with a non-circular periphery; forming an offset flange on the periphery of said body with a first portion depending from the periphery and a second portion extending outwardly from the lower end of said first portion such that said offset flange extends into the cavity of the mold; said cavity having a bottom surface and side surfaces; said offset flange being suspended in the cavity in accurately spaced relation to the bottom surface of the cavity and in accurately spaced relation to the side surfaces of the cavity wherein said predetermined quantity of uncured vinyl plastic material is poured into said cavity to cover the upper and lower surfaces of said second portion of said offset flange wherein said vinyl plastic material when cured forms a resilient plastic body bonded to said second portion of said flange and having surfaces accurately located with respect to said metal body*

*5. The method of making a sealing member as claimed in claim 4 further comprising: pouring said plastic material to a depth sufficient to contact at least a portion of said first portion of said offset flange, and curing said plastic material to bond it to said portion of said of first portion of said flange.*

*6. A method of making a sealing body as defined in claim 1 further comprising: forming said metal body with a non-circular periphery; forming a downwardly turned flange on the peripheral edge of said metal body such that said flange defines the portion of the metal body on which the plastic body is to be formed and is suspended in the cavity in accurately spaced relation to the bottom of the cavity and in accurately spaced relation laterally of the cavity such that when the vinyl plastic material is introduced into said cavity and cured in situ, said vinyl plastic material becomes bonded to said flange and defines a gasket thereon which has bottom and side surfaces that are accurately formed.*

References Cited

The following references, cited by the Examiner, are of record in the patented file of this patent or the original patent.

UNITED STATES PATENTS

| | | | |
|---|---|---|---|
| 2,142,230 | 1/1930 | Yancey. | |
| 2,358,259 | 9/1944 | Siedschlag et al. | 264—275 X |
| 2,573,225 | 10/1951 | Seamark | 277—235 |
| 2,599,767 | 6/1952 | Long | 277—235 |
| 2,658,238 | 11/1953 | Rizzo | 18—36 |
| 2,676,823 | 4/1954 | Olson et al. | 264—294 X |
| 2,701,894 | 2/1955 | Hammerly et al. | 264—299 X |
| 2,718,664 | 9/1955 | Schweitzer | 264—261 |
| 2,736,067 | 2/1956 | Boschi | 264—261 |
| 2,796,635 | 6/1957 | Harvender. | |
| 2,893,058 | 7/1959 | Wurtz | 18—36 X |
| 2,949,635 | 8/1960 | Chiero | 18—36 |
| 3,063,097 | 11/1962 | Jutzi | 18—36 |
| 3,258,831 | 7/1966 | Angele | 264—275 XR |
| 3,297,800 | 1/1967 | Bradley | 264—275 XR |

FOREIGN PATENTS 1,175,881 11/1958 France.

ROBERT F. WHITE, Primary Examiner

RICHARD R. KUCIA, Assistant Examiner

U.S. Cl. X.R.

264—275